United States Patent
Paul et al.

(10) Patent No.: US 11,456,621 B2
(45) Date of Patent: Sep. 27, 2022

(54) FIELD DEVICE OF AUTOMATION TECHNOLOGY

(71) Applicant: Endress+Hauser SE+Co. KG, Maulburg (DE)

(72) Inventors: Tobias Paul, Schopfheim (DE); Ralph Stib, Schönau (DE); Harald Schäuble, Lörrach (DE); Patrick Geib, Bad Säckingen (DE); Simon Gerwig, Schopfheim (DE); Mike Frank, Lörrach (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 431 days.

(21) Appl. No.: 16/747,890

(22) Filed: Jan. 21, 2020

(65) Prior Publication Data
US 2020/0244103 A1 Jul. 30, 2020

(30) Foreign Application Priority Data
Jan. 29, 2019 (DE) ...................... 10 2019 102 162.6

(51) Int. Cl.
*H02J 50/10* (2016.01)
*H02J 7/02* (2016.01)
*G01D 11/24* (2006.01)

(52) U.S. Cl.
CPC ............... *H02J 50/10* (2016.02); *H02J 7/02* (2013.01); *G01D 11/245* (2013.01)

(58) Field of Classification Search
CPC ........... H02J 50/10; H02J 7/02; G01D 11/245
USPC ......................................................... 429/213
See application file for complete search history.

(56) References Cited

U.S. PATENT DOCUMENTS

| | | | |
|---|---|---|---|
| 10,375,208 B2* | 8/2019 | Alkkiomäki | H04L 67/141 |
| 2017/0242601 A1* | 8/2017 | Rantanen | G05B 19/0426 |
| 2019/0026411 A1* | 1/2019 | Mehas | H01F 27/255 |

FOREIGN PATENT DOCUMENTS

| | | |
|---|---|---|
| DE | 102010040866 A1 | 3/2012 |
| DE | 102012105463 A1 | 12/2013 |
| EP | 2709231 A1 | 3/2014 |

* cited by examiner

*Primary Examiner* — Alfonso Perez Borroto
(74) *Attorney, Agent, or Firm* — Kelly J. Smith; Endress+Hauser (USA) Holding Inc.

(57) ABSTRACT

A field device of automation technology includes a field device housing and a field device electronics arranged in the field device housing. The field device also includes a first rechargeable battery arranged in the field device housing for energy supply of the field device electronics and a receiving unit with a receiving coil for receiving wirelessly inductively transmitted energy. The receiving unit is connected with the rechargeable battery so that the received, wirelessly inductively transmitted energy is storable, and is stored, in the rechargeable battery. The field device electronics is adapted in such a manner that energy supply occurs exclusively or at least partially from the first rechargeable battery and wherein the receiving unit and the receiving coil are adapted to receive wirelessly inductively transmitted energy as defined in a Qi standard 1.2.4 or a standard derived therefrom and to store such in the first rechargeable battery.

6 Claims, 1 Drawing Sheet

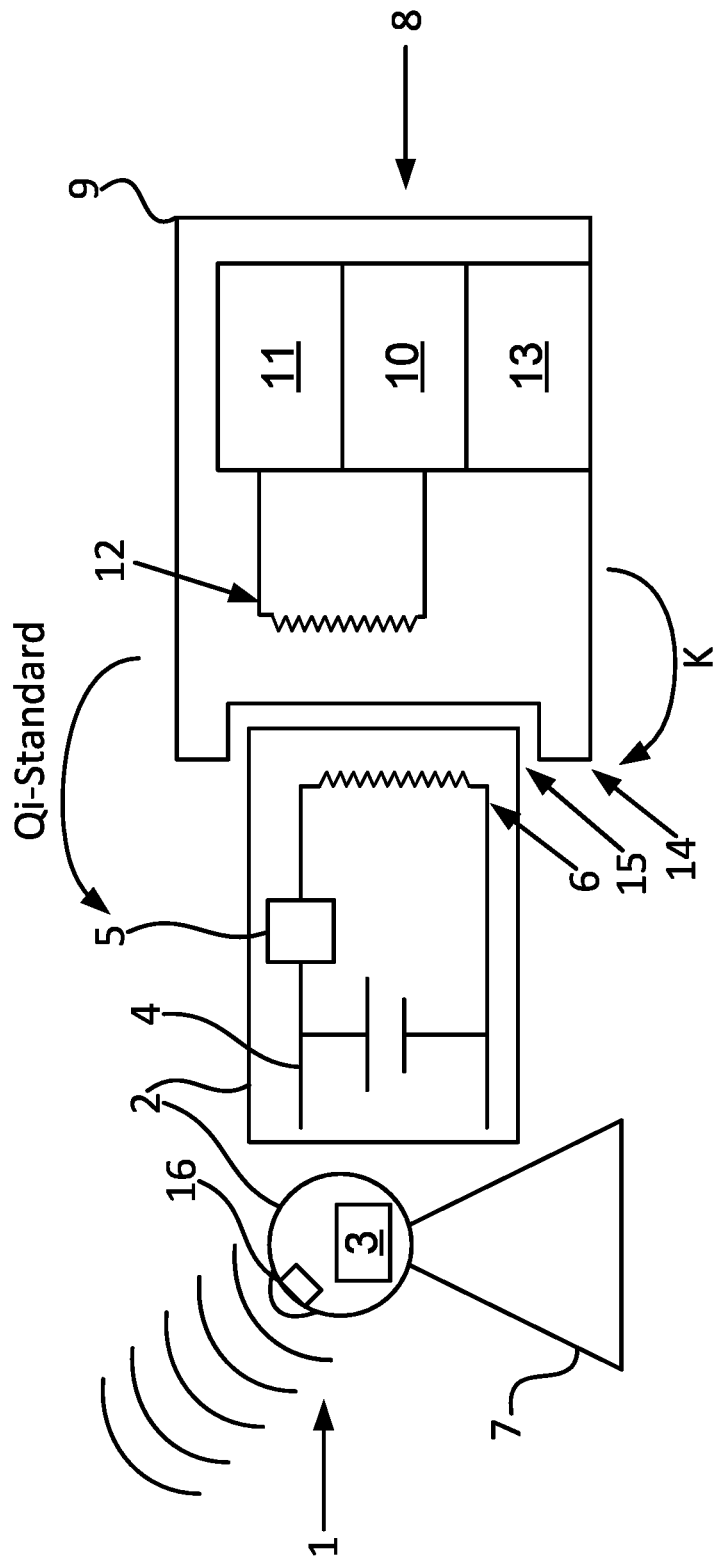

FIELD DEVICE OF AUTOMATION TECHNOLOGY

CROSS-REFERENCE TO RELATED APPLICATION

The present application is related to and claims the priority benefit of German Patent Application No. 10 2019 102 162.6, filed on Jan. 29, 2019, the entire contents of which are incorporated herein by reference.

TECHNICAL FIELD

The present disclosure relates to a field device of automation technology, to a charging system for a field device of automation technology as well as to a system of automation technology.

BACKGROUND

In process automation technology, field devices are often applied, which serve for registering and/or influencing process variables. Examples of such field devices include fill level measuring devices, mass flow measuring devices, pressure- and temperature measuring devices, etc. In such case, sensors register corresponding process variables, such as, for example, fill level, flow, pressure and/or temperature.

Serving for influencing process variables are actuators, e.g. valves or pumps, via which e.g. the flow of a liquid in a pipeline section or the fill level in a container can be changed.

Referred to as field devices are, in principle, all devices, which are applied near to the process and which deliver, or process, process relevant information.

Increasingly, such field devices are manufactured as purely rechargeable battery driven field devices or at least as rechargeable battery supported field devices. Purely rechargeable battery driven field devices are distinctive in that they do not have to have a two-wire line, or, in given cases, a four wire line, led to them for energy supply and/or for transmission of measured values, for example, by means of the 4 . . . 20 mA standard usual in automation technology.

The trend in automation technology for simpler installation, lessened costs and less need for maintenance, as well as the demand for uninterrupted registering of information even in inaccessible or remote areas, further increases the need for purely rechargeable battery driven or at least rechargeable battery supported field devices. In pursuit of this trend, currently a large number of mechanisms for saving power and better predictions of power level as well as power requirement are being developed, from which expected remaining run time and time remaining until the next charging should be ever more precisely determined.

In spite of all efforts toward optimizing device runtime, an integrated rechargeable battery must, however, after a certain time be charged in the context of a maintenance interval of the field device. In such case, it is usually necessary to open the field device. Furthermore, possible plug connectors must be removed and screws released. This means not insignificant effort, at times performed under harsh environmental conditions, which are not unusual in automated plants. For example, in the case of rain or snow, an opening of the housing is generally not advisable, or only possible under difficult conditions.

SUMMARY

It is, thus, an object of the present disclosure to provide solutions for the above described problem.

The object of the present disclosure is achieved by a field device of automation technology, a charging system for such a field device and a system of automation technology as defined.

The field device of the present disclosure for automation technology includes a field device housing and a field device electronics arranged in the field device housing. A first rechargeable battery is arranged in the field device housing for energy supply of the field device electronics. The field device also includes a receiving unit with a receiving coil for receiving wirelessly inductively transmitted energy. The receiving unit is connected with the rechargeable battery so that received, wirelessly inductively transmitted energy is storable, and is stored, in the rechargeable battery. The field device electronics is adapted in such a manner that energy supply occurs exclusively or at least partially from the first rechargeable battery, and the receiving unit and the receiving coil are adapted to receive wirelessly inductively transmitted energy as defined in a Qi standard 1.2.4 or a standard derived therefrom and to store such in the first rechargeable battery.

The present disclosure relates further to a charging system for a field device of automation technology including a housing, a charging system electronics arranged in the housing, a transmitting unit with a transmitting coil for transmitting energy wirelessly inductively, and an energy supply unit arranged in the housing for energy supply of the charging system electronics and for providing energy to be transmitted wirelessly inductively via the transmitting coil. The transmitting unit and the transmitting coil are adapted to transmit energy wirelessly inductively as defined in a Qi standard 1.2.4 or a standard derived therefrom.

Recently, a group of companies has formed the Wireless Power Consortium, which has developed the so-called Qi standard for interoperability of devices, such as charging devices. Details concerning the Qi standard are published, for example, at: http://www.wirelesspowerconsortium.com/developers/specification.html.

The Qi technology provides wireless inductive transmission of energy in a low power range of up to 15 W in a transmitting frequency range of 110 Hz to 205 kHz and a transmitter operating voltage of 19 V. The transmitting and receiving coils are planar or slightly dished and oppositely lying, typically arranged with a separation of up to 5 mm. The basic construction for the Qi technology provides a base station with a transmitting coil, which transmits energy to a receiving unit with a receiving coil. In such case, the receiving unit is regularly coupled to a rechargeable battery, in order to charge such electrically. The receiving unit communicates, moreover, unidirectionally with the transmitting unit via associated monitoring units, in order to be able to perform a specific power matching via load modulation.

An advantageous embodiment of the charging system of the present disclosure provides that the energy supply unit includes a second rechargeable battery, which provides energy for the charging system electronics and energy for wireless inductive transmission via the transmitting coil.

An alternative embodiment of the charging system of the present disclosure provides that energy supply unit includes an electrical grid supplied power supply, which provides energy for the charging system electronics and energy for wireless inductive transmission via the transmitting coil.

The present disclosure relates further to a system of automation technology including at least one field device and at least one charging system. The charging system has a first coupling section and the field device has a second coupling section. The transmitting coil is arranged in the first coupling section of the charging system and the receiving coil in the second coupling section of the field device. A surface contour of the first coupling section is matched to a surface contour of the second coupling section, so that the charging system can be placed on the field device housing and in a placed on state energy is transmittable, and is transmitted, wirelessly inductively.

An advantageous embodiment of the system of the present disclosure provides that the transmitting coil and the receiving coil are arranged respectively in the first, and second, coupling sections in the placed on state in such a manner relative to one another that a coupling factor is maximum, such as greater than 0.2, greater than 0.3, or even greater than 0.5.

BRIEF DESCRIPTION OF THE DRAWINGS

The present disclosure will now be explained in greater detail based on the appended drawing, the sole FIGURE of which shows as follows:

FIG. 1 shows a field device of the present disclosure having a charging system of the present disclosure for the field device.

DETAILED DESCRIPTION

FIG. 1 shows a field device 1 of automation technology, which is adapted for registering and/or setting a process variable based on a sensor- and/or actuator unit 7. According to the present disclosure, field device 1 includes a field device housing 2, a field device electronics 3 arranged in the field device housing 2 and a first rechargeable battery 4 arranged in the field device housing 2 for energy supply of the field device electronics 3. Field device electronics 3 is, in such case, preferably embodied in such a manner that energy supply occurs exclusively or at least partially from the first rechargeable battery 4. As a function of how the field device electronics 3 is embodied, the field device here is a purely rechargeable battery-operated or a rechargeable battery-supported field device. Field device 1 includes a radio unit 16 for wireless communication, for example, of measured values, or even parameters.

The field device includes besides the radio unit 16, furthermore, according to the present disclosure, a receiving unit 5 with a receiving coil 6 for receiving wirelessly inductively transmitted energy. The receiving unit 5 with the coil 6 can be embodied as a unit separate from the field device electronics 3 and be electrically connected with the field device electronics 3, such as shown, by way of example, in FIG. 1. Alternatively, the receiving unit 5 and/or the receiving coil 6 can also be part of the field device electronics 3. The receiving unit 5 is, furthermore, connected with the first rechargeable battery 4 arranged in the field device housing 2, so that the received, wirelessly inductively transmitted energy can be stored in the rechargeable battery 4. For receiving the wirelessly inductively transmitted energy, the receiving unit 5 and the receiving coil 6 are adapted to receive energy as defined in a Qi standard 1.2.4 or a standard derived therefrom.

FIG. 1 shows, furthermore, a charging system 8 of the present disclosure for the field device 1 of automation technology. Charging system 8 includes a housing 9, a charging system electronics 10 arranged in the housing 9, a transmitting unit 11 with a transmitting coil 12 for transmitting energy wirelessly and inductively, and an energy supply unit 13 arranged in the housing 9 for energy supply of the charging system electronics 10 and for providing energy to be transmitted wirelessly inductively via the transmitting coil 12. Transmitting unit 11 and transmitting coil 12 are likewise adapted to transmit energy wirelessly inductively according to a Qi standard 1.2.4 or a standard derived therefrom.

Energy supply unit 13 can comprise, for example, a second rechargeable battery, which provides the energy for the charging system electronics 10 and the energy transmitted wirelessly inductively via the transmitting coil 12. Alternatively, the energy supply unit can comprise a power supply, which is supplied via an electrical grid, for example, at a grid voltage of 220 or 110 V.

Field device 1 and charging system 8 are preferably matched to one another in such a manner that the transmitting coil 12 is arranged in a first coupling section 14 of the charging system 8 and the receiving coil 6 in a second coupling section 15 of the field device 1, wherein a surface contour of the first coupling section 14 is matched to a surface contour of the second coupling section 15. The two surface contours are, in such case, embodied in such a manner that the charging system 8 can be placed, or set, at or on the field device in only a single orientation. Alternatively, the surface contours and the arrangement of the coils 6, 12 can also be so embodied such that the charging system 8 remains in the charging position independently of orientation and preferably also without additional locking or measure, such that a charging process takes place. In order to achieve an optimal efficiency for the wireless inductive energy transmission, the transmitting coil 12 and the receiving coil 6 in the first, and second, coupling sections 14, 15 can in the placed on state be arranged in such a manner relative to one another that a coupling factor K is maximum, greater than 0.2, greater than 0.3, or greater than 0.5. Referred to as coupling factor K, in such case, is the size of the coupling between the transmitting- and receiving coils, wherein "0" means no coupling and "1" means perfect coupling.

The field device 1 of the present disclosure and the charging system 8 of the present disclosure enable a charging process without necessitating an opening of the field device housing 2 and without interruption of the readiness of the field device for use. Charging system 8 can remain on the field device 1, until the desired state of charge is achieved, or until the charging system 8 has no more power to provide. Thereafter, the charging system can either be transported to the next field device 1 to be charged or be transported for a recharging of the charging system. A maintenance person or service technician is needed, in such case, only for the time it takes to place the charging system on the field device, or for other transport of the charging system 8, for example for its recharging. After engagement, the remaining duration of a charging procedure can occur unmonitored.

The invention claimed is:
1. A field device of automation technology, comprising:
a field device housing;
a field device electronics arranged in the field device housing;
a first rechargeable battery arranged in the field device housing for energy supply of the field device electronics;
a receiving unit with a receiving coil for receiving wirelessly inductively transmitted energy, wherein the receiving unit is connected with the rechargeable battery, so that received, wirelessly inductively transmitted energy is storable, and is stored, in the rechargeable battery;

wherein the field device electronics is adapted in such a manner that energy supply occurs exclusively or at least partially from the first rechargeable battery and wherein the receiving unit and the receiving coil are adapted to receive wirelessly inductively transmitted energy as defined in a Qi standard 1.2.4 or a standard derived therefrom and to store such in the first rechargeable battery.

2. A charging system for a field device of automation technology, comprising:
a housing;
the charging system electronics arranged in the housing;
a transmitting unit with a transmitting coil for transmitting energy wirelessly inductively; and
an energy supply unit arranged in the housing for energy supply of the charging system electronics and for providing energy to be transmitted wirelessly inductively via the transmitting coil;
wherein the transmitting unit and the transmitting coil are adapted to transmit energy wirelessly inductively as defined in a Qi standard 1.2.4 or a standard derived therefrom.

3. The charging system of claim 2, wherein the energy supply unit includes a second rechargeable battery, which provides energy for the charging system electronics and energy for wireless inductive transmission via the transmitting coil.

4. The charging system of claim 2, wherein the energy supply unit includes a grid supplied power supply, which provides energy for the charging system electronics and energy for wireless inductive transmission via the transmitting coil.

5. A system of automation technology, comprising:
at least one field device, including: a field device housing; a field device electronics arranged in the field device housing; a first rechargeable battery arranged in the field device housing for energy supply of the field device electronics; and a receiving unit with a receiving coil for receiving wirelessly inductively transmitted energy, wherein the receiving unit is connected with the rechargeable battery, so that received, wirelessly inductively transmitted energy is storable, and is stored, in the rechargeable battery; wherein the field device electronics is adapted in such a manner that energy supply occurs exclusively or at least partially from the first rechargeable battery and wherein the receiving unit and the receiving coil are adapted to receive wirelessly inductively transmitted energy as defined in a Qi standard 1.2.4 or a standard derived therefrom and to store such in the first rechargeable battery; and
at least one charging system, including: a housing; the charging system electronics arranged in the housing; a transmitting unit with a transmitting coil for transmitting energy wirelessly inductively; and an energy supply unit arranged in the housing for energy supply of the charging system electronics and for providing energy to be transmitted wirelessly inductively via the transmitting coil; wherein the transmitting unit and the transmitting coil are adapted to transmit energy wirelessly inductively as defined in a Qi standard 1.2.4 or a standard derived therefrom;
wherein the charging system has a first coupling section and the field device has a second coupling section, wherein the transmitting coil is arranged in the first coupling section of the charging system and the receiving coil in the second coupling section of the field device, wherein a surface contour of the first coupling section is matched to a surface contour of the second coupling section, so that the charging system can be placed on the field device housing and in a placed on state energy transmittable is, and is transmitted, wirelessly inductively.

6. The system of automation technology of claim 5, wherein the transmitting coil and the receiving coil are arranged respectively in the first, and second, coupling sections in the placed on state in such a manner relative to one another that a coupling factor is greater than 0.2.

* * * * *